A. KRAUTH.
WEB SUPPORT FOR AUTOGRAPHIC REGISTERS.
APPLICATION FILED MAR. 27, 1911.
1,119,179.
Patented Dec. 1, 1914.
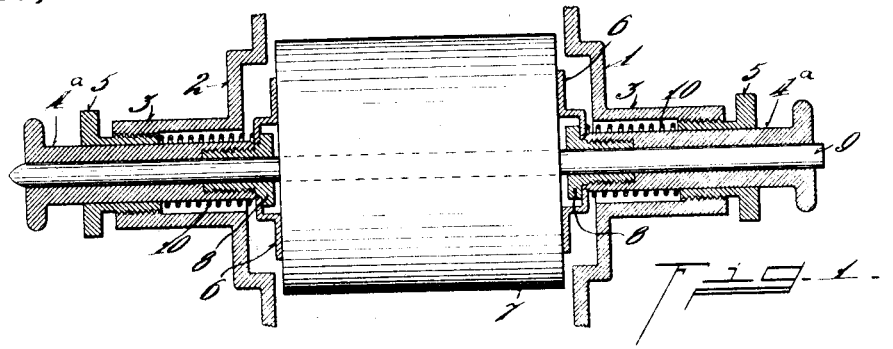
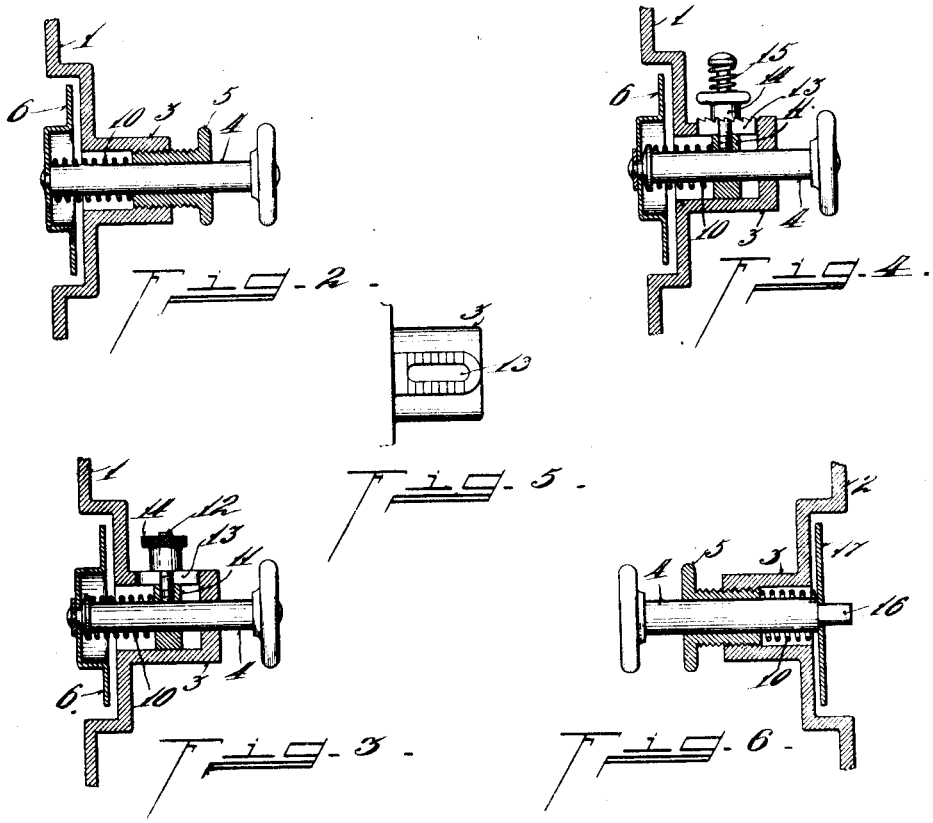

UNITED STATES PATENT OFFICE.

ALBERT KRAUTH, OF HAMILTON, OHIO.

WEB-SUPPORT FOR AUTOGRAPHIC REGISTERS.

1,119,179.  
Specification of Letters Patent.  
Patented Dec. 1, 1914.

Application filed March 27, 1911. Serial No. 617,054.

*To all whom it may concern:*

Be it known that I, ALBERT KRAUTH, a citizen of the United States, residing at Hamilton, in the county of Butler and State of Ohio, have invented certain new and useful Improvements in Web-Supports for Autographic Registers, of which the following is a specification.

My invention relates to an improvement in tension means for supporting rolls of paper in autographic registers.

The object of my invention is to provide a movable spindle provided with a cup-shaped disk at one end thereof, adapted to engage a web of paper, with means for exerting tension upon said spindle and disk in a direction toward the paper, together with means for adjusting the tension.

The features of the invention are more fully set forth in the description of the accompanying drawings, forming a part of this specification, in which:—

Figure 1 is a sectional view of roll supporting means mounted in position within the register casing, and having a pintle projecting through the core of the roll of paper. Fig. 2 is a section illustrating a modified form of roll support. Fig. 3 is a sectional view of a third modified form. Fig. 4 is a sectional view of a fourth modified form. Fig. 5 is a detail top plan view of a projecting boss formed on the frame of the machine, employing the type of roll support shown in Fig. 4. Fig. 6 is a sectional view of a fifth modified form of roll support.

In the various forms of roll supports, shown herein, the same characteristics are embodied in having a spindle movably supported upon the side frames of a register, one end provided with a hand hold or knurl, and its opposite end provided with a disk adapted to engage the sides of a roll or web of paper, tension means for maintaining the spindle and disk in a direction toward the paper, together with means for adjusting the tension, and means adapted to engage with the core of the paper roll to serve as a pintle to prevent displacement of the roll when the tension has been withdrawn.

In the form shown in Fig. 1, 1, 2, represent the side frames of a register, each provided with the sleeve extensions 3. 4ª represents a spindle, in this instance of tubular form, slidably mounted within a sleeve-nut 5 screw threaded into the sleeve 3, projecting from the side frame. 6 represents a disk loosely supported upon the inner end of the spindle 4ª, bearing against the side of the roll of paper 7, and held in position upon said spindle by means of the sleeve nut 8, screw threaded within a bore formed within the spindle. 9 represents a spindle rod, projected through the spindle 4ª, and core of a roll of paper. 10 represents a coil spring, one end engaging the disk 6, the opposite end the nut 5, and its tension governed by the adjustment of the nut 5 within the sleeve projection 3. The supporting mechanism is carried out in duplicate upon each of the two side frames, between which the roll is supported, as a preferable form, but it is obvious, that only one side may be equipped.

In the form shown in Fig. 2, the spindle 4 is not of sleeve form, as that shown in Fig. 1, no provision being made for the spindle rod. The cup disk 6 is mounted on the spindle in a transposed position from that shown in Fig. 1. In this form of roll support the cup portion of the disk projects into the core of the roll of paper.

In the forms shown in Figs. 3, 4 and 5, the spring 10 engages against a collar 11 slidably mounted upon the spindle 4, within the sleeve or boss projection 3 of the casing. Said collar is provided with a pin 12, projecting through an oblong slot 13, formed in the sleeve projection 3, the sleeve, in this instance, is provided with a closed end, through which the spindle passes and is supported. 14 represents a knurl screw-threaded upon the pin 12, for clamping the collar in any adjusted position. By this adjustment of the collar the tension of the spring can be increased or decreased. In the form shown in Fig. 4, the upper portion of the sleeve adjacent to the oblong slot 13 is serrated, and the knurl 14 is likewise serrated, engaging with the serrations of the sleeve, but loosely mounted upon the pin 12, and a spring 15 interposed between the knurl and head of the pin. Thus, an adjustment of the collar 11 can be made by raising the knurl to disengage the same from the casing sleeve projection.

In Fig. 6, the spindle is provided with a pintle end 16, and a flat disk 17, in place of the cup-shaped disk illustrated in the other views, with the remainder of the structure being substantially the same as that shown and described in Fig. 2.

Having described my invention, I claim:—

1. A web support for autographic registers combining two concentric tubular members, one rigid and the second adjustable within the first, a spindle longitudinally slidable within the second member having a cupped disk on one end thereof, and a spring intervening between said disk and second member for urging said disk from said member.

2. A web support for autographic registers combining a casing having its inner surface recessed and an apertured boss extending from the outer surface opposite said recess, a sleeve member adjustably mounted within said boss aperture, manually accessible means exterior of said boss for adjusting the sleeve member, a spindle concentrically slidable within said sleeve having a cup disk on the inner end thereof movable within the recess of the casing, and a spring engaging said disk and sleeve.

3. A web support for autographic registers combining a casing having an apertured boss extending from the exterior surface thereof, a screw threaded sleeve within the aperture of said boss having a radially extending element exterior of the boss for manually moving said sleeve, a spindle slidably supported within said sleeve, a web engaging disk at one end of the spindle, the opposite end of the spindle provided with a hand hold exterior of the casing for moving said spindle and a spring engaging said disk and sleeve.

In testimony whereof, I have hereunto set my hand.

ALBERT KRAUTH.

Witnesses:
OLIVER B. KAISER,
EMMA SPENER.